United States Patent [19]
Döemer

[11] 3,986,053
[45] Oct. 12, 1976

[54] REGENERATOR FOR PULSE CODE MODULATION SYSTEMS

[75] Inventor: Josef Döemer, Hohenschaeftlarn, Germany

[73] Assignee: Siemens Aktiengesellschaft, Berlin & Munich, Germany

[22] Filed: Feb. 13, 1975

[21] Appl. No.: 549,656

[30] Foreign Application Priority Data
Feb. 19, 1974 Germany............................ 2407954

[52] U.S. Cl.............................. 307/268; 307/269; 328/164; 179/15 AD
[51] Int. Cl.²..................... H03K 5/01; H03B 1/00; H04B 1/10
[58] Field of Search ............ 307/268, 269; 328/164; 179/15 AD, 170 R; 178/70 R

[56] References Cited
UNITED STATES PATENTS

| | | |
|---|---|---|
| 3,355,549 | 11/1967 | Alexander et al............... 179/15 AD |
| 3,737,585 | 6/1973 | Ghosh................................ 328/164 |
| 3,745,257 | 7/1973 | Fudemoto et al.................. 328/164 |
| 3,757,051 | 9/1973 | Girard et al. ...................... 328/164 |
| 3,835,398 | 9/1974 | Russer ............................... 328/164 |
| 3,873,775 | 3/1975 | Chown............................. 179/15 AD |

Primary Examiner—Stanley D. Miller, Jr.
Attorney, Agent, or Firm—Hill, Gross, Simpson, Van Santen, Steadman, Chiara & Simpson

[57] ABSTRACT

A pulse code modulation regenerator includes an input transformer which is connected to an amplitude decision device with its output connected to a phase discriminator and to a time decision means, and which has a pulse generator connected through a low pass filter to the phase discriminator. The output of the pulse generator is also connected to the time decision device.

8 Claims, 8 Drawing Figures

REGENERATOR FOR PULSE CODE MODULATION SYSTEMS

BACKGROUND OF THE INVENTION

1. Field of the Invention

This invention relates in general to pulse code modulation regenerators and in particular to a novel and improved pulse code modulation regenerator.

2. Description of the Prior Art

Pulse code modulation regenerators are known as, for example, a system described in the publication entitled "Nachrichtenuebertragung" by Hoelzler and Thierbach, Springer-Verlag Berlin, Heidelberg, New York, 1966, pages 498 to 503. See also the publication entitled "Technische Rundschau," No. 9 of Mar. 5, 1971, at pages 9, 11 and 13. Also, such systems are described in German Pat. No. AS 1,961,950 and in German Pat. No. OS 2,004,036.

SUMMARY OF THE INVENTION

In view of the increasing use of the PCM technique, it is desirable to transmit a large number of speech channels through a single PCM transmission link. Link regenerators capable of processing very high data bit rates are necessary, and in order to keep the cost in reasonable limits, it is desirable to design as much as possible of the PCM equipment by integrated circuit techniques.

Therefore, the aim of the present invention is to develop a PCM regenerator circuit capable of processing data at a high rate which can be, to the greatest possible extent, designed using integrated circuit techniques. The regenerator circuit must be capable of processing $\sin^2$ half wave signals which are preferably used as input signals at higher bit rates since a transfer into this signal form ensures that the system will be free to the optimum amount from disturbing influences such as thermal noise and cross-talk. Also, the power for driving the regenerators which are distributed throughout the transmission link must be supplied by the data cable and thus each of the regenerators must not exceed a specific power consumption.

In the present invention the PCM regenerator has an amplitude decision device which contains one signal path for positive signals and one for negative signals with each of the two signal paths being formed from a differential amplifier composed of two transistors and operated with common emitters and with the base of one of the two transistors connected to a secondary end terminal of the input transformer. The output of one of the differential amplifiers is connected directly to an input of the time decision device and through a switchback diode to the corresponding output of the time decision device. The collectors of the input transistors of the two differential amplifiers are connected together and through a Zener diode to the first input of a current generator. The phase discriminator contains two D flip-flops and a current generator and the setting input of the two D flip-flops is connected to the outputs of one of the differential amplifiers of the amplitude decision device. The D-input of the two D flip-flops are connected to ground and their Q outputs are connected together through a pair of diodes. The common connection between the diodes is connected through a resistor to the second input of the current generator. The current amplifier contains a differential amplifier which is connected through a Zener diode to the first current amplifier input and consists of two npn transistors and the output of the amplifiers is connected to the current amplifier output. The current amplifier contains an amplifier stage which is operated with emitter connection and consists of a pnp transistor which has its input connected to the second current amplifier input and its output connected to the current amplifier output. The current amplifier output is connected through a low pass filter to the input of a quartz crystal oscillator which serves as a pulse generator and emits a pulse train oscillation which is supplied to a rectangular wave shaping circuit. The output of the wave shaping circuit supplies an input to the time decision device and through the time decision device to the triggering inputs of the two D flip-flops of the phase discriminator.

This invention utilizes the recognition that transistorized switching stages operating in unsaturated condition have a relatively small current consumption and operate satisfactorily at very high frequency rates. The advantages of the invention are that substantial integration and the possibility of direct control of TTL circuits without the use of coupling and matching stages results in an overall greatly reduced structure and a much smaller price than that of prior art devices.

If only binary pulses having one polarity occur at the input of the regenerator circuit, in other words, those of the type designated RZ format, a modification of the invention makes a further reduction in size in that it is possible to process the binary signals utilizing a simplified amplitude decision device which contains only one differential amplifier comprising two transistors. Also, a simplified phase discriminator can be used which contains only one D flip-flop whose Q output is connected without diodes through a resistor to the second input of the current generator. Also, a simplified time decision device can be utilized which requires only a single current path.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
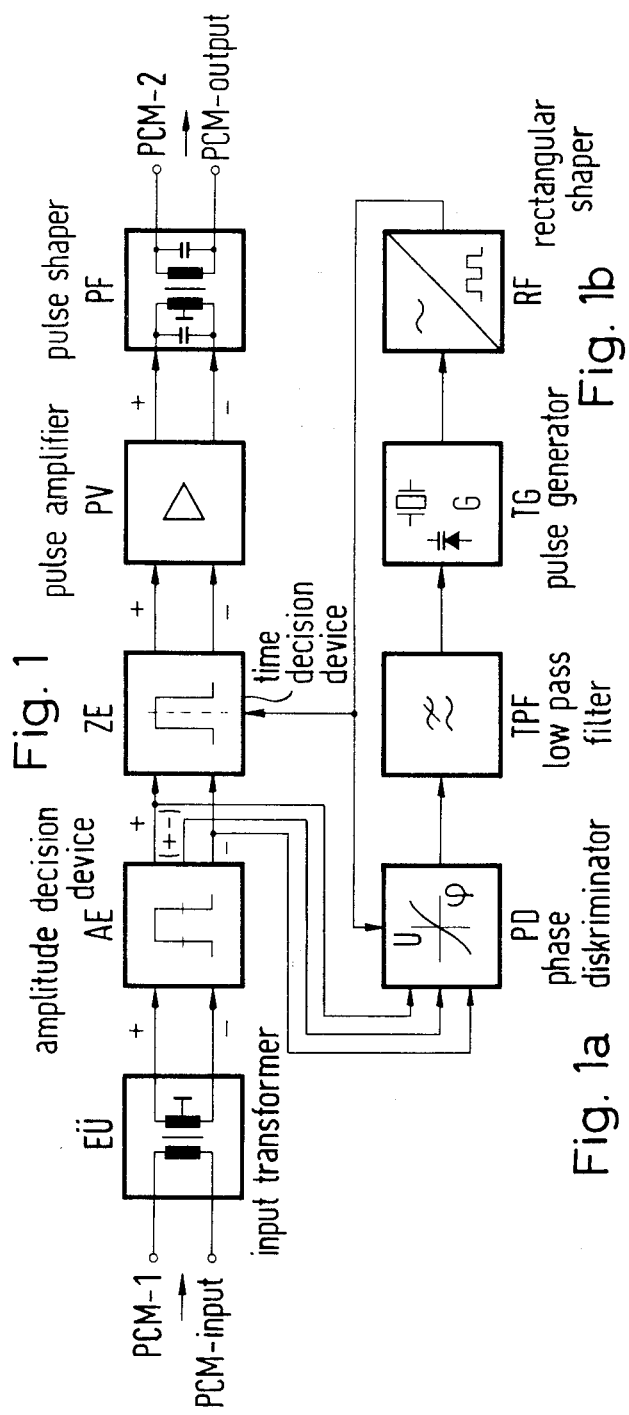
FIG. 1 illustrates in block form the PCM regenerator for bipolar signals.
Figure 1A:
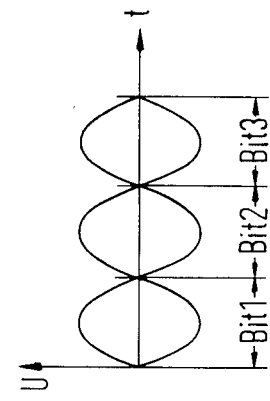
FIG. 1a is a plot of three bits of the PCM signal at the input of the PCM regenerator of the invention shown in FIGS. 1 and 2.

FIG. 1 illustrates in block diagram form the PCM regenerator of the invention. The input PCM signal 1 is supplied to the input of the PCM regenerator normally in the form of $\sin^2$ half waves as shown in FIG. 1a. FIG. 1a is in the form of an eye diagram and illustrates superimposed one upon another as a function of time, all of the function sequences possible at a specific point, in other words, all of the possible transitions from a first bit to the next bit, as for example from 1 to 0, from 1 to −1 and so forth.

An input transformer EU is connected to the input terminals of the regenerator and its secondary winding has a ground tap. The outputs of the secondary winding of the input transformer EU are connected to the input terminals of an amplitude decision device AE which receives the PCM signals. The amplitude decision device AE comprises a threshold value switch which has thresholds as illustrated in FIG. 1a of +S and −S which are set at one half the positive and one-half the negative peak voltage levels of the signals. The amplitude decision device AE rectifies the positive and negative pulses and supplies the rectified signals at its output on plus and minus terminals. Also, the combined output is supplied on the terminal indicated by plus-minus. A phase discriminator PD receives all three of the outputs of the amplitude decision device AE and also receives an input comprising a timing signal from a rectangular wave shaper RF. The phase discriminator produces a control voltage at its output which is supplied through a low pass filter TPF. The output of the low pass filter TPF is supplied to a pulse generator TG which may be cyrstal controlled. The pulse generator TG contains a voltage-dependent capacitor in the frequency-determining circuit such that the control voltage supplied to it from the low pass filter TPF controls the output frequency of the pulse generator. The output of the pulse generator TG is supplied to the rectangular wave shaper RF which changes the sinusoidal oscillations into a rectangular wave which form the timing pulses which are supplied to the phase discriminator PD and to the time decision device ZE.

The structure just described comprises a closed control loop circuit utilizing the "phase-locked-loop" principle. The time decision device ZE receives the positive and negative pulses from the output of the amplitude decision device AE separately through two inputs and thus the plus and negative outputs of the amplitude decision device are received and the time decision device ZE emits these pulses in the middle of a relevant bit, as controlled by the rectangular pulse train oscillation supplied by the rectangular wave shaper RF.

The outputs of the time decision device ZE are positive and negative and are supplied to the two inputs of pulse amplifier PV. The time decision device ZE emits its output pulses in the middle of the relevant bit as controlled by the rectangular pulse train from the rectangular wave shaper RF.

The pulse amplifies PV amplifies the positive and negative pulses separately and applies two outputs to a pulse shaper PF which includes a transformer having low pass filter characteristics, wherein the amplified pulses are converted into sinusoidal half waves and supplied to the output terminals of the pulse amplifier PV.

Figure 1B:
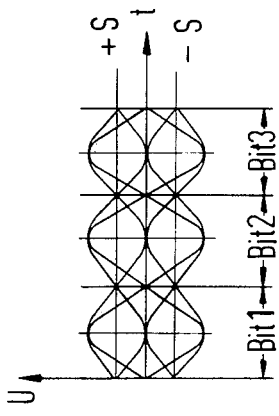
FIG. 1b is a plot of three bits occurring at the output of a PCM regenerator of the invention.

The second eye diagram illustrated in FIG. 1b represents the regenerated PCM signal which appears at the output of the pulse shaper PF and is available for transmission over additional sub-links.

Figure 2:
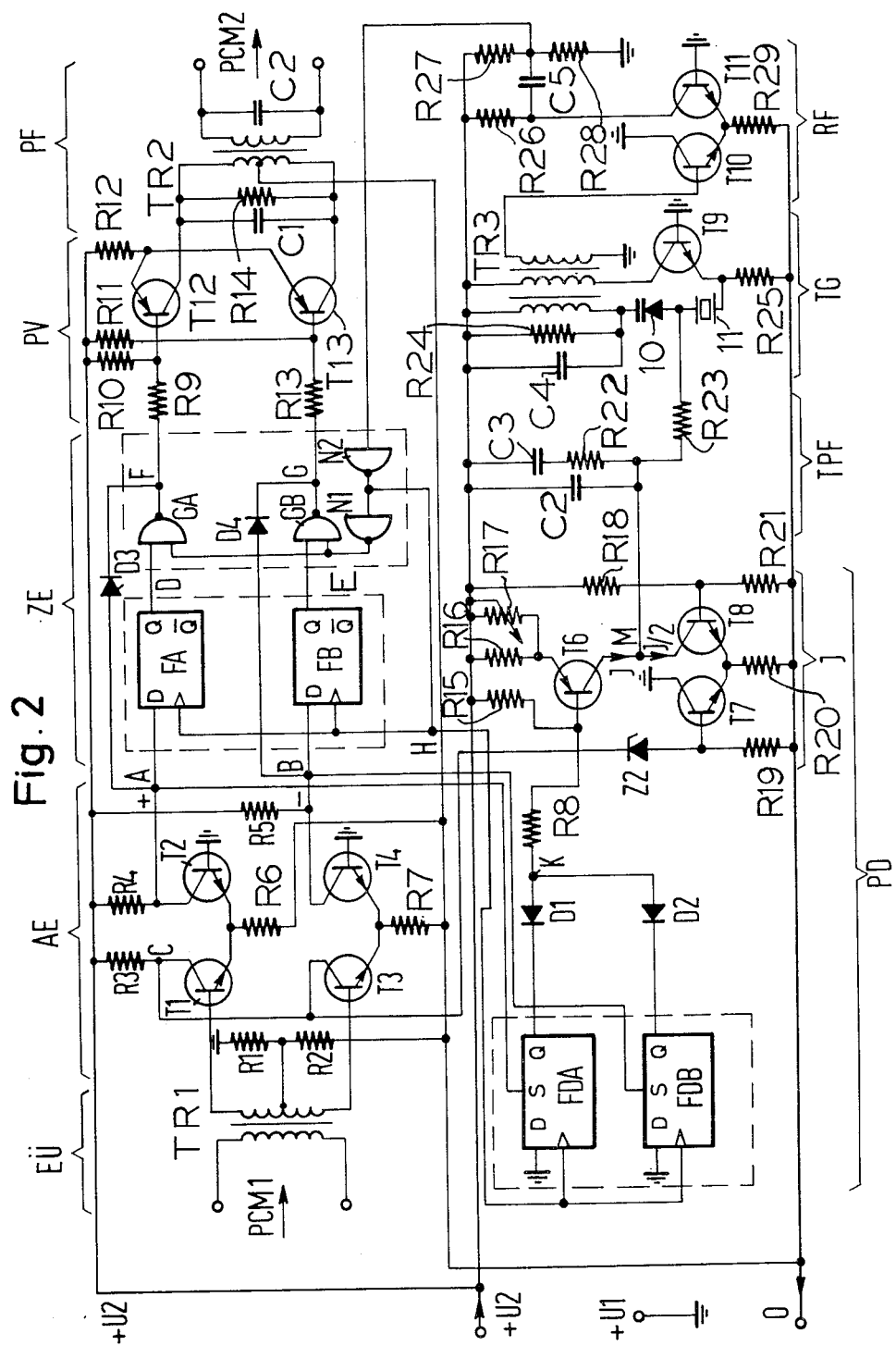
FIG. 2 is an electrical schematic diagram of the PCM regenerator of the invention.

FIG. 2 is a detailed electrical circuit diagram of the apparatus illustrated in FIG. 1. The incoming signal PCM 1 is supplied to the input terminals of a transformer TR1 which has its mid-point connected to the connection point between a pair of resistors R1 and R2. The amplitude decision device consists of 4 npn transistors T1, T2 and T3 and T4 with the base of transistors T1 and T3 connected to opposite ends of the secondary of the transformer TR1. The transistors T1 through T4 comprise a pair of differential amplifiers and the operative point of the input transistors T1 and T3 of the two differential amplifiers is set by means of the voltage divider formed by the two resistors R1 and R2. The collectors of the two input transistors T1 and T3 are connected to one another and to the output terminal for the plus-minus output of the amplitude decision device AE which comprises the combined positive and negative pulses. The collectors of transistors T1 and T3 and supplied an operating voltage through resistor R3. The positive and negative pulses of the supplied PCM signal can be separately obtained from the collectors of the output-end transistors T2 and T4 of the differential amplifiers with the plus output appearing at collector of transistor T2 and the negative output appearing at the collector of transistor T4. Resistors R4 and R5 supply operating voltage to the collectors of transistors T2 and T4. The plus output is supplied to terminal A which is connected to the input of the time decision device ZE and the negative output from transistor T4 is connected to terminal B which is supplied to the time decision device ZE. The bases of transistors T2 and T4 are connected to ground. The voltage difference between the mean voltage plus U1 and the supply voltage plus U2 is selected to be approximately 5V so that the TTL (Transistor - Transistor - Logic) modules can be directly connected to the collectors of the two output-end transistors.

An amplitude decision device AE constructed in this manner has a number of advantages one of which is that the amplitude threshold is independent of temperature and the transistors operate in unsaturated fashion in the operation of TTL modules and thus very short switching times and very small current consumption will result. Since npn transistors and resistors are utilized it is very simple to utilize an integrated circuit for the construction of the amplitude decision device AE.

The time decision device ZE receives the outputs from terminals A and B from amplitude decision device AE. Device ZE consists of two D flip-flop FA and FB, two NAND gates, GA, GB and two inverter stages N1 and N2. The D input terminals of the D flip-flops receive the plus and negative inputs from terminals A and B and receive the positive and negative pulses respectively from the amplitude decision device AE. The Q output of the first flip-flop FA is connected through the NAND gate GA to a first output F of the time decision device ZE. The output Q of the second D flip-flop FB is connected through the NAND gate GB to a second output terminal G of the time decision device ZE. The second inputs to the two NAND gates GA, GB are connected together and to the output of an inverter N2 through which the timing signal is supplied. The two inverters N1 and N2 are connected in series and the timing signal is supplied through them and at the junction point between the inverters an inverse timing signal is obtained which is supplied to the two setting input terminals of the D flip-flops FA, FB of the time decision device ZE and this terminal is indicated as terminal H.

The phase discriminator PD consists of the phase discriminator and includes the current generator J. The phase discriminator proper includes two D flip-flops FDA and FDB. A pair of diodes D1 and D2 are connected to the Q outputs of the flip-flops and to an output terminal K. Terminal A is connected to the S input of flip-flop FDA and terminal B is connected to the S input of flip-flop FDB. Resistor R8 is connected from a junction point K between the diodes D1 and D2 to the base of a transistor T6 of the current generator J. Transistor T6 is pnp type and is operated in an emitter connection. The second input of the current generator J is connected through a Zener diodes Z2 to the plus and minus output of the amplitude decision device AE to receive the combined signal. This input of the current generator J is connected to the base of a transistor T7 which is the first transistor of a differential amplifier composed of two npn transistors T7 and T8. The emitters of these transistors are connected together. The collector of transistor T7 is connected to ground and the collector of the second transistor T8 of the differential amplifier is connected to the collector of transistor T6 and the outputs of these transistors simultaneously represent the output of the differential amplifier. This output is designated terminal M which is supplied as an input to the low pass filter TPF which comprises the capacitors C2, C3 and resistors R22 and R23 as shown.

Thus, the phase discriminator PD is adapated to the time decision device ZE and it is expedient to consider the two assemblies in terms of their functions. In both assemblies, D flip-flops connected to utilize the TTL technique are used. These flip-flop switches switch with the positive flank of a supplied pulse train oscillation. In the built up state the positive pulse train flank must be maintained in the middle of the bit, that is in the middle in terms of time, of a positive pulse at the D input of one of the two D flip-flops of the time decision device. A positive half wave of the bipolar PCM signal appears as a positive pulse at the D input of the first D flip-flop FA of the time decision device ZE as a signal terminal A. Also, a negative half wave of the bipolar PCM signal appears as a positive pulse at the D input of the secod D flip-flop FB at terminal B. Simultaneously, the bipolar PCM signals from terminals A and B are conducted to second of the two D flip-flops of the phase discriminator through its setting inputs S and as a result these D flip-flops, FDA and FDB are prepared for switch-over by a supplied pulse train oscillation. If a positive pulse train flank now appears, the first D flip-flop of the time decision device ZE and at the same time the first D flip-flop of the phase discriminator PD or the second D flip-flop FB of the time decision device ZE and the second D flip-flop FDB of the phase discriminator PD switch-over the logic state at the relevant output Q. Since the two D flip-flops FDA and FDB of the phase discriminator are as a result of the supply of the signals A and B to the setting inputs, directly reset by these signals, the switch-back of the two D flip-flops FA and FB of the time decision device ZE occurs only with the next pulse train flank which arrives at the earliest one bit-width later. The duration of the output pulses from the discriminator flip-flops FDA and FDB is thus, in contrast to the duration of the output pulses from the D flip-flops of the time decision device, directly dependent upon the phase state of the pulse train oscillation.

Figure 3:
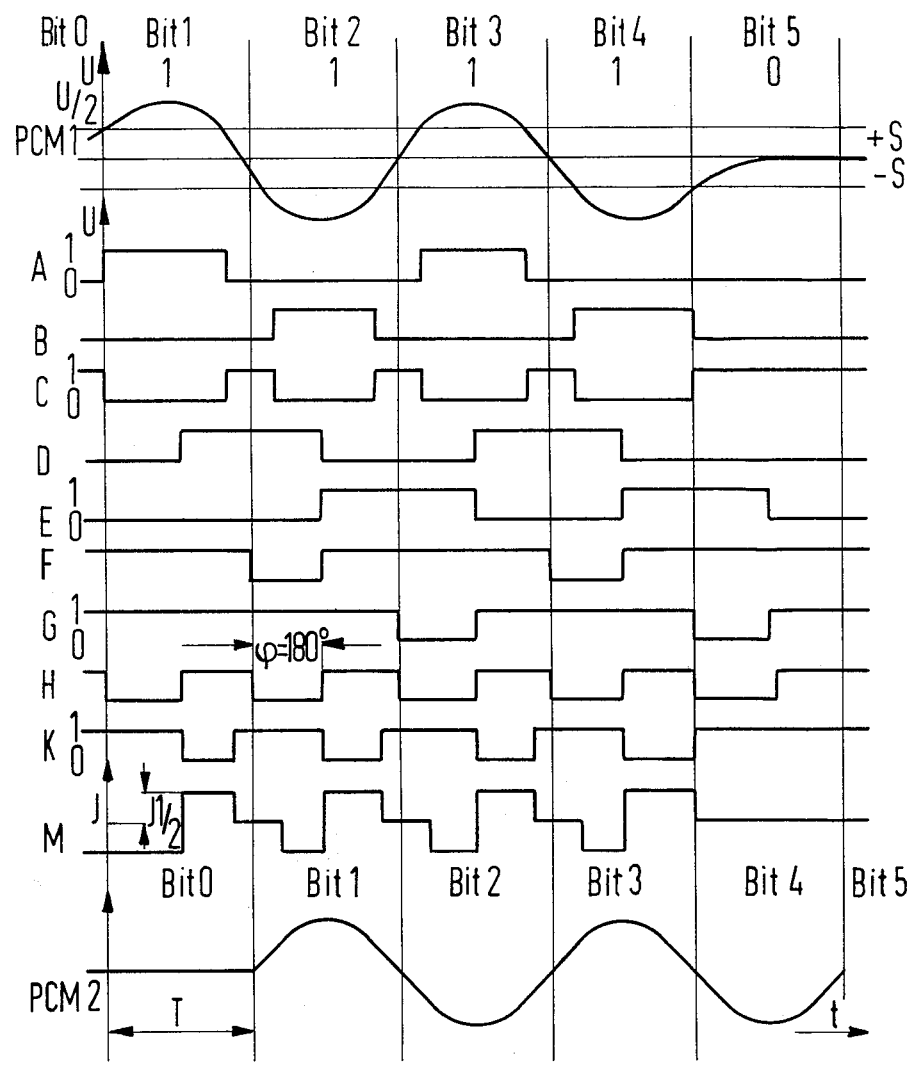
FIG. 3 is a plot of waveforms in the PCM regenerator for the word "1-1-1-10."

This can be observed in FIG. 3 which illustrates the wave shapes at different terminals in the circuit of FIG. 2. FIG. 3 illustrates the wave shape progression between the signal PCM 1 and PCM 2 at different points in the circuit and it may be observed from FIG. 3 that in the event of a pulse train frequency which is too low the positive flank of the pulse train oscillation H will apparently move in the direction of the rear flank of the signals A and B. Thus, the output pulse KU of the phase discriminator which is coupled through the two diodes D1 and D2 becomes increasingly narrower, whereas if the pulse train frequency is too high there will correspondingly be an increase in the width of the pulse at terminal K. It is to be realized in this disclosure that the wave shape at the terminals A through M are designated in FIG. 3 as wave shapes A through M.

The discriminator output pulse which is directly dependent on the phase of the pulse train is transformed into a current pulse of constant amplitude in the emitter amplifier stage by the transistor T6. As a result of the opposing connection of the output signals C emitted at the same time at the plus-minus output for the combined signals of the amplitude decision device, which have been transformed into current pulses having the amplitude J and the constant width t1 through the Zener diode Z2 in the differential amplifiers formed from the transistors T7 and T8, a signal M appears at the connection point of the collectors of the two transistors T6 and T8. Such signal M is furnished through the low pass filter TPF to the pulse generator TG and changes the voltage across the capacitive diode 10 located in the frequency-determining circuit of the oscillator TG so as to control the oscillating frequency of the pulse generator TG.

The low pass filter TPF between the discriminator and the pulse generator TG merely serves to filter the current pulses and to set up the control circuit amplification and prevents the individual pulses from the phase discriminator PD from directly reaching the pulse generator TG. After the initial build-up, a current equilibrium is produced at the connection point of the collectors of the second transistors T6 and T8 of the phase discriminator which equilibrium can be adjusted by changing the current amplitude I in the collector circuit of transistor T6 by using the variable resistor R17. A change in setting of the current amplitude I results in a corresponding change in the phase state of the pulse train oscillation relative to the individual bits of the PCM signal.

The pulse generator is illustrated as a quartz-controlled oscillator controlled by the quartz crystal 11 and the capacitive diode 10 which are connected in a one-stage base circuit of the transistor T9 supplied through a feedback transformer TR3. The oscillation amplitude of the pulse generator TG is limited on the collector-base characteristic curve by an input transistor T10 of a differential amplifier which acts as a rectangular shaper RF and consists of two npn transistors T10 and T11. A rectangular pulse train oscillation can be directly obtained from the output transistor T11 of the rectangular shaper and thus the rectangular oscillation is produced in a circuit which is not very expensive and consumes very little current.

The two D flip-flops FA and FB of the time decision device ZE produce two pulse trains D and E which, respectively, provide one input of one of the two NAND gates GA and GB which are derived from the Q outputs of the flip-flops.

The gates GA and GB emit negative pulses of a width of one half bit to the two outputs of the time decision device in accordance with the supplied pulse train oscillation and said pulses are illustrated in FIG. 3 by wave trains F and G.

The output wave trains pulses F and G of the time decision device ZE are supplied to the two inputs of a pulse amplifier PV constructed from two pnp transistors T12 and T13. These transistors are provided with a common emitter resistor R12 and the pulse shaper PF is connected to the collector circuit of the transistors T12 and T13. The pulse shaper PF comprises a transformer TR2 having determinate stray field between primary and secondary and includes capacitors C1 and C2 connected across the primary and secondary respectively to form a low pass filter which is matched to the surge impedance of the connecting cable. At the secondary of the pulse shaper transformer the PCM output designated as PCM 2 in FIG. 3 is obtained and is utilized as a feed-in into the adjoining cable path.

The splitting of the signal path in the time decision device and the phase discriminator into two separate signal paths reduces the operating frequency of the modules which conduct the separate signal paths. This reduction in the operating speed and the current generator J which operates in unsaturated condition provides the possibility of processing very high bit repetition frequencies.

In the above described PCM regenerator, in the case of specific PCM signals the phase control circuit can be temporarily set at an incorrect operating point which leads to phase jumps in the pulse train oscillation. If, for example, the input of the described PCM regenerator is supplied with quasi-statistical pulse patterns, for example pseudo-random signals from shift registers exhibiting feedback or specific periodic word sequences with strong spectral lines at the first subharmonics of the pulse train frequency, a specific, incorrect phase may be established.

Figure 4:
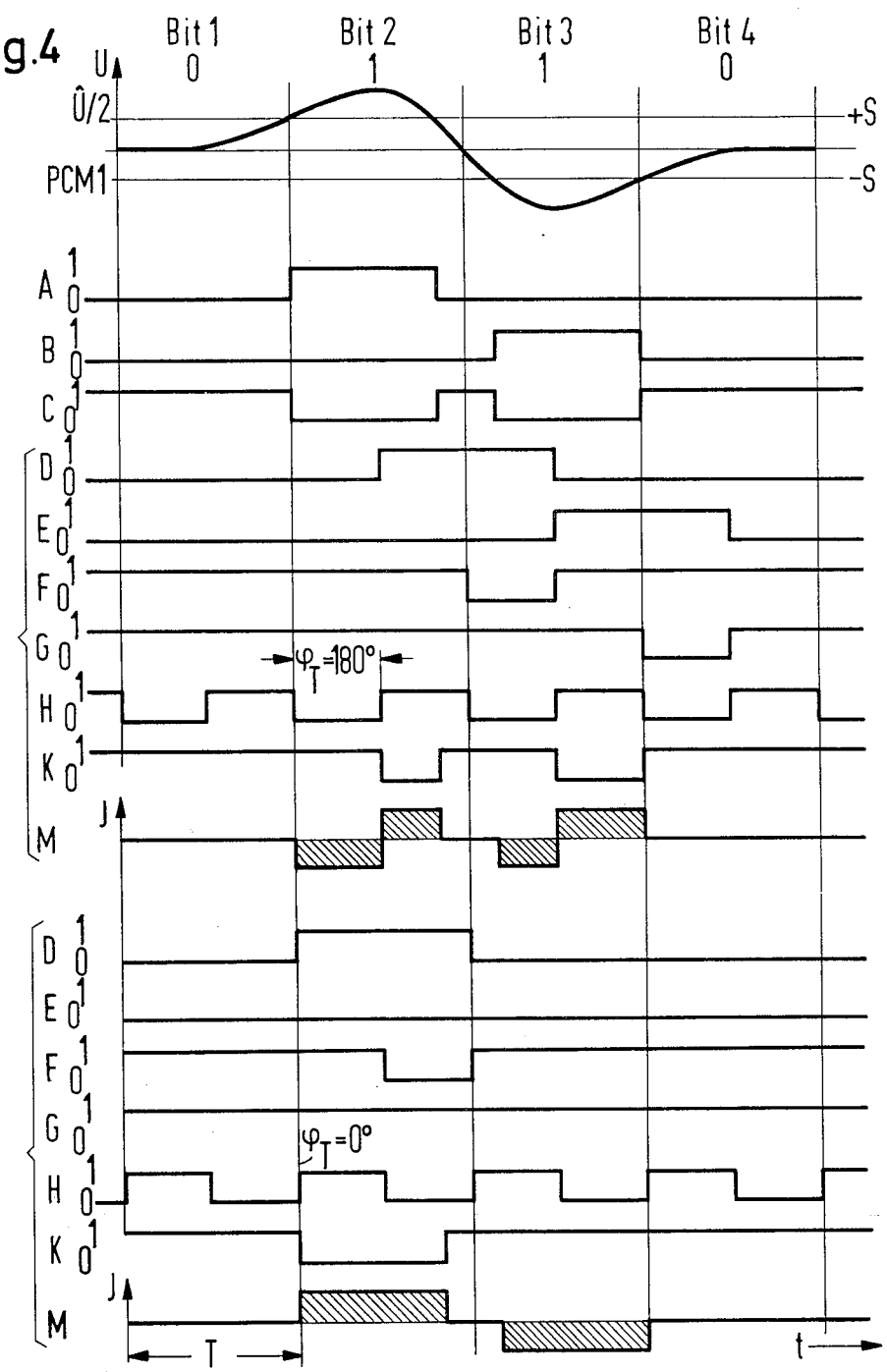
FIG. 4 is a plot of another pulse for the PCM word "0-1-1-0."

FIG. 4 illustrates such a case in a pulse diagram which corresponds to FIG. 3. The repetitive PCM work 0-1-1-0 which results in an incorrect phase setting of this kind has been selected as a critical pulse pattern. FIG. 4 illustrates the two possibilities both of which can lead to a current equilibrium at the output of the phase discriminator and thus produce a stable phase condition. In case $a$ the phase shift between the incoming bit and the positive flank of the pulse train oscillation is $\gamma = 180°$ and in case $b$ is $\gamma = 0°$.

Figure 5:
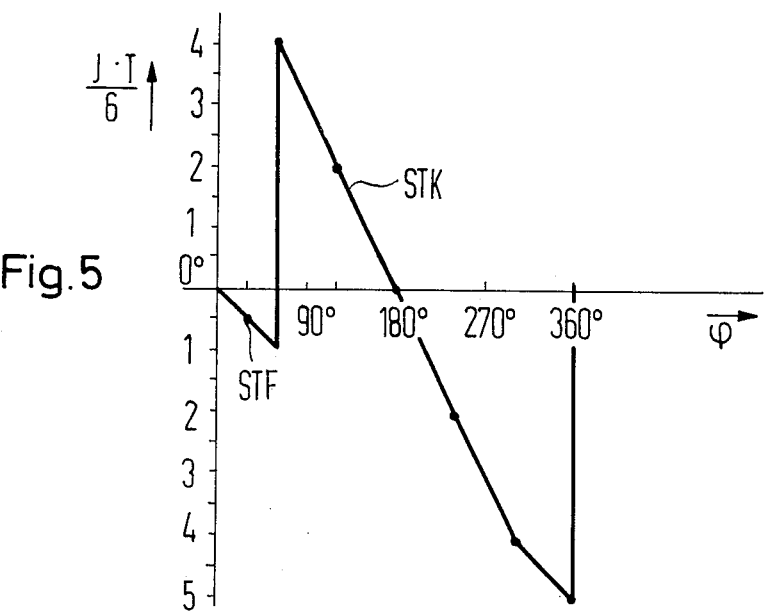
FIG. 5 is the characteristic curve of a phase discriminator without switchback diodes for the PCM word "0-1-1-0.

FIG. 5 illustrates the phase discriminator curve for the above described PCM word 0-1-1-0 in which in addition to the first stable curve component with the correct phase STR, a second stable curve component with the incorrect phase STF exist. The curve shown in FIG. 5 is formed because the phase is continuously changed between the incoming bit and the positive flank of the pulse train oscillation and thus the current-time produce product $I \cdot T$ at the output of the phase discriminator changes accordingly with the selected PCM word. Since in both sections of the curve the differential quotients have the same sign both parts of the curve are stable.

Computer observations have shown that the incorrect phase cannot be set to a stable condition until the current I through the transistor T6 of the current generator of the phase discriminator is more than double the current through the transistor T8 of the differential amplifier of the current generator. In order to safely eliminate the possibility of setting the phase on the second stable part of the curve with the incorrect phase, the invention provides two additional switch-back diodes. This assures that the time decision device which has two signal paths have their outputs connected to the inputs through these diodes. This ensures that as illustrated in FIG. 6 that from the formerly stable part of the curve with the incorrect phase illustrated in FIG. 5 there results an astable curve component in which the differential quotient of the curve becomes zero and at this pont a stable operation thus becomes impossible.

Figure 6:
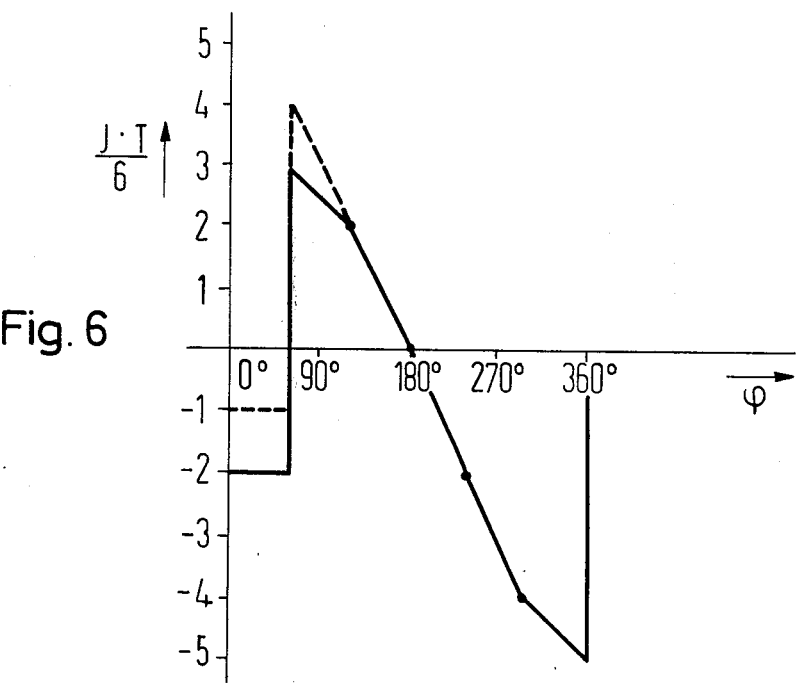
" and FIG. 6 is the characteristic curve of a phase discriminator utilizing switchback diodes for the PCM word "0-1-1-0."

The upper part of the phase discriminator curve illustrated in FIG. 6 also shows, in broken lines, a curve component which results in the case of a delay time of up to one-sixth of the pulse train period. This delay time of T/6 which was established with practical measurements is produced through signal transit times in the individual modules, but as shown in FIG. 6 does not have a negative effect on the function of the circuit. In addition the two switch-back diodes reduce the sensitivity of the circuit to interference. The two switch-back diodes prevent two bits of equal polarity occurring directly consecutively as they block the D-inputs of the D flip-flops FA and FB of the time decision device ZE following the transfer of a pulse on the appearance of the next pulse train flank.

When fewer demands are made on the frequency stability of the regenerator, it is possible to replace the quartz oscillator by an LC oscillator. In this case there is an increased basic jitter of the pulse train phase which automatically results in a jumping out of the stable part of the curve of the phase discriminator with the incorrect phase (STF illustrated in FIG. 5). In this case it is possible to dispense with the switch-back diodes. The switch-back diodes are also not necessary when the PCM input signal PCM 1 is available in sinusoidal half wave form or as a binary RZ signal.

It is seen that this invention provides a new and novel RCM regenerator and though it has been described with respect to preferred embodiments it is not to be so limited as changes and modifications may be made therein which are within the full intended scope as defined by the appended claims.

I claim as my invention:
1. A PCM regenerator comprising:
   an input transformer,
   an amplitude decision device connected to said input transformer,
   a phase discriminator and a time decision device connected to the outputs of said amplitude decision device,
   a pulse amplifier connected to the output of said time decision device,
   a pulse shaper connected to the output of said pulse amplifier,
   a pulse generator,
   a low pass filter connected to the output of said phase discriminator,
   said pulse generator connected to the output of said low pass filter, the output of said pulse generator connected to said time decision device and to said phase discriminator, said amplitude decision device containing one signal path for positive signals and one signal path for negative signals, a pair of differential amplifiers in said signal paths and each consisting of two transistors and operated in emitter connection, with the base of one of said two transistors of each connected to opposite ends of the said secondary input transformer, the output of one of said differential amplifiers connected directly to the input of said time decision device, a pair of switch-back diodes, each connected to an output of said time decision device and their outputs connected to the commonly connected collectors of said ones of said two transistors, a current generator having first and second input terminals and an output terminal, a first Zener diode connected to a first input of said current generator, a pair of D flip-flop circuits having setting D, Q and triggering terminals, and said current generator contained in said phase discriminator, the setting terminal inputs of each of said pair of D flip-flop circuits connected to the output of one of said differential amplifiers of said amplitude decision device, the D terminal inputs of said two D flip-flop circuits connected to ground fourth and fifth diodes and the Q terminal outputs connected to one side of said fourth and fifth diodes, a resistor connected to said second input terminal of said current generator and to the other sides of said fourth and fifth diodes, an additional differential amplifier contained in said current generator, a second Zener diode connecting said additional differential amplifier to said first input terminal of said current generator, and said differential amplifier comprising two npn transistors with their outputs connected to said current generators output terminal, said current generator containing an amplifier stage which is operated in emitter connection and consists of a pnp transistor with its input connected to the second input terminal of said current generator and its output connected to said input terminal of said current generator, a low pass filter connected to said output terminal of said current generator, a quartz oscillator which is said pulse generator connected to the output of said low pass filter and its frequency controlled thereby, and a rectangular shaper receiving the output of said oscillator and supplying an output to said time decision device and to the triggering terminals of said pair of D flip-flop circuits of said phase discriminator.

2. A PCM regenerator according to claim 1 wherein said pair of differential amplifiers are connected in Transistor - Transistor - Logic manner.

3. A PCM regenerator according to claim 1 wherein said additional differential amplifier is connected in Transistor - Transistor - Logic manner.

4. A PCM regenerator according to claim 1 wherein said pulse amplifier includes a pair of transistors.

5. A PCM regenerator according to claim 1 wherein a wave shaper is connected between said pulse generator and said time decision device and said phase discriminator.

6. A PCM regenerator according to claim 5 wherein said wave shaper includes a pair of transistors connected in Transistor - Transistor - Logic manner.

7. A PCM regenerator according to claim 1 wherein said pulse generator includes a voltage variable capacitor which receives the output of said low pass filter.

8. A PCM regenerator comprising:
an input transformer,
an amplitude decision device connected to said input transformer,
a phase discriminator and a time decision device connected to the outputs of said amplitude decision device,
a pulse amplifier connected to the output of said time decision device,
a pulse shaper connected to the output of said pulse amplifier,
a pulse generator,
a low pass filter connected to the output of said phase discriminator and supplying an input to said pulse generator,
the output of said pulse generator connected to said time decision device and to said phase discriminator,
a flip-flop circuit having setting, D, Q and triggering terminals contained in said phase discriminator and said flip-flop circuit having its setting terminal connected to the output of said amplitude decision device,
a diode connected to said Q terminal,
a resistor connected to said diode and said resistor connected to said low pass filter,
the output of said pulse generator connected to the triggering terminal of said flip-flop circuit, and
a quartz oscillator which is said pulse generator connected to the output of said low pass filter and its frequency controlled thereby.

* * * * *